United States Patent
Ono (10) Patent No.: US 8,861,027 B2
(45) Date of Patent: Oct. 14, 2014

(54) APPRATUS AND SYSTEM FOR CONVERTING AND CREATING COLOR IMAGE DATA INVOLVING A BLACK-AND-WHITE PATTERN CORRELATED WITH A SINGLE COLOR INCLUDING A FEATURE VARIED ACCORDING TO COLOR DENSITY

(71) Applicant: Seiko Epson Corporation, Tokyo (JP)

(72) Inventor: Satoru Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 46 days.

(21) Appl. No.: 13/728,825

(22) Filed: Dec. 27, 2012

(65) Prior Publication Data

US 2013/0182268 A1    Jul. 18, 2013

(30) Foreign Application Priority Data

Jan. 13, 2012    (JP) .................................. 2012-004819

(51) Int. Cl.
  *H04N 1/56*    (2006.01)
  *G06K 15/02*   (2006.01)
  *H04N 1/46*    (2006.01)

(52) U.S. Cl.
  CPC . *H04N 1/46* (2013.01); *H04N 1/465* (2013.01)
  USPC ............................ 358/1.9; 358/3.28; 358/530

(58) Field of Classification Search
  None
  See application file for complete search history.

(56) References Cited

U.S. PATENT DOCUMENTS

| | | | |
|---|---|---|---|
| 4,703,318 A * | 10/1987 | Haggerty ....................... 345/634 |
| 5,701,401 A * | 12/1997 | Harrington et al. ............ 358/1.9 |
| 5,930,385 A | 7/1999 | Fujimoto et al. |
| 6,204,934 B1 | 3/2001 | Minamino |
| 6,304,345 B1 * | 10/2001 | Patton et al. .................. 358/527 |
| 8,537,410 B2 * | 9/2013 | Kobayashi ................... 358/1.18 |
| 2005/0280872 A1 | 12/2005 | Noel |
| 2006/0187475 A1 | 8/2006 | Fujioka |
| 2008/0130059 A1 | 6/2008 | Shindo et al. |
| 2009/0185225 A1 * | 7/2009 | Kobayashi ................... 358/1.18 |
| 2009/0185226 A1 * | 7/2009 | Kobayashi ................... 358/1.18 |
| 2009/0185233 A1 * | 7/2009 | Kobayashi ................... 358/3.28 |
| 2011/0052057 A1 | 3/2011 | Aihara |
| 2013/0044949 A1 * | 2/2013 | Ono .............................. 382/167 |

FOREIGN PATENT DOCUMENTS

| | | |
|---|---|---|
| EP | 0446008 A2 | 9/1991 |
| EP | 0 521 718 A2 | 1/1993 |
| JP | 06-208357 A | 7/1994 |
| JP | 2011-023895 A | 2/2011 |

OTHER PUBLICATIONS

Extended European Search Report dated May 21, 2013 as received in Application No. 13150964.8.

* cited by examiner

*Primary Examiner* — Scott A Rogers
(74) *Attorney, Agent, or Firm* — Maschoff Brennan (57) ABSTRACT

An image processing apparatus includes: an image data acquisition section configured to acquire image data corresponding to a black-and-white image which allows a feature thereof correlated with a color to be represented by a density level of one single color; a color determination section configured to determine a corresponding color which corresponds to the feature included in the black-and-white image; and a color image data creation section configured to create the color image data corresponding to a color image which allows an image area thereof indicating the feature to be represented in the corresponding color.

8 Claims, 10 Drawing Sheets

| COLOR VALUE | | | PATTERN TYPE | OTHER THAN WATERMARK-INFORMATION LOCATION | | WATERMARK-INFORMATION LOCATION | | WATERMARK-INFORMATION LOCATION (X, Y) |
|---|---|---|---|---|---|---|---|---|
| R | G | B | | FOREGROUND DENSITY | BACKGROUND DENSITY | FOREGROUND DENSITY | BACKGROUND DENSITY | |
| 255 | 0 | 0 | GRID LINE | 128 | 186 | 186 | 255 | (0, 0), (0, 4), (4, 0), (4, 4) |
| 254 | 0 | 0 | GRID LINE | 128 | 186 | 186 | 255 | (1, 0), (0, 4), (3, 0), (4, 4) |
| ... | | | | | | | | |
| 0 | 0 | 239 | HORIZONTAL LINE | 253 | 228 | 221 | 221 | (2, 0), (0, 2), (2, 4), (4, 2) |
| ... | | | | | | | | |
| 0 | 0 | 0 | NONE | 255 | 255 | 255 | 255 | (2, 2), (2, 3), (3, 2), (3, 3) |

APPRATUS AND SYSTEM FOR CONVERTING AND CREATING COLOR IMAGE DATA INVOLVING A BLACK-AND-WHITE PATTERN CORRELATED WITH A SINGLE COLOR INCLUDING A FEATURE VARIED ACCORDING TO COLOR DENSITY

BACKGROUND

1. Technical Field

The present invention relates to an image data creation apparatus, an image processing apparatus, an image processing system, an image data creation method, an image processing method, an image data creation program and an image processing program which perform processing for conversion between color image data and black-and-white image data.

2. Related Art

Heretofore, in order to convert color image data to black-and-white data, there has been widely used a method of calculating gray values from corresponding RGB values of color image data in accordance with a formula (1) shown below to obtain black-and-white data represented by the gray values. Since the gray values reflect corresponding pieces of brightness information related to an original color image, this method enables obtaining of image data corresponding to a black-and-white image reflecting the brightness levels of the original color image. In addition, in the formula (1), "R", "G" and "B" denote a gray-scale value for red, a gray-scale value for green and a gray-scale value for blue, respectively, and "Gray" denotes a gray value, that is, a density level of a single black color.

$$Gray = 0.3R + 0.59G + 0.11B \quad (1)$$

Further, in the case where color image data is converted to black-and-white data in accordance with the formula (1), as a result, a plurality of RGB values, such as (R, G, B)=(255, 0, 0), (0, 128, 0), is converted into corresponding gray values which are approximately equal to one another. As described above, a plurality of colors having been different from one other in a color image before conversion result in gray colors having substantially the same gray value in a black-and-white image after conversion, thereby, sometimes, making it difficult to distinguish colors of an original color image before conversion from a black-and-white image after conversion.

In order to overcome this disadvantage, in JP-A-2011-23895, there has been proposed a method for converting a color image into a black-and-white image in accordance with the following processes: converting an original color image into color images which are represented in cyan, magenta and yellow, respectively; applying a dither matrix to the individual color images to create different binary dot patterns for the respective colors; and combining the resultant binary dot patterns for the respective colors to obtain a target black-and-white image. According to this method disclosed in JP-A-2011-23895, it is possible to obtain a black-and white image resulting from superimposing mutually different patterns which are represented in colors of cyan, magenta and yellow, respectively. Thus, even in the case where, for example, different colors (R, G, B)=(255, 0, 0), (0, 128, 0) and the like, which result in having substantially the same gray value after having been converted into gray values, are used in an original color image, the resultant black-and-white image reflects the different colors used in the original color image as corresponding features having mutually different patterns. Accordingly, even though colors resulting in being indistinguishable after having been converted into gray values are used in an original color image before the conversion, it is possible to convert image data corresponding to the original color image into image data corresponding to a black-and-white image from which the differences of colors in the original color image can be distinguished.

In the method disclosed in JP-A-2011-23895, however, although it is possible for users to distinguish the differences of colors in an original color image from a resultant black-and-white image, it is difficult to restore the original color image from the black-and-white image because it is difficult to specifically find out which one of the colors each feature of the black-and-white image corresponds to.

SUMMARY

An advantage of some aspects of the invention can be achieved by an embodiment or application examples described below.

Application Example 1

An image data creation apparatus for creating color image data, including: an image data acquisition section configured to acquire image data corresponding to a black-and-white image which allows a feature thereof correlated with a color to be represented by a density level of one single color; a color determination section configured to determine a corresponding color which corresponds to the feature included in the black-and-white image; and a color image data creation section configured to create the color image data corresponding to a color image which allows an image area thereof indicating the feature to be represented in the corresponding color.

According to this image data creation apparatus, it is possible to obtain color image data corresponding to a color image in which image areas indicating respective features included in the black-and-white image are represented in corresponding colors which corresponds to the respective features. Accordingly, it is possible to restore a color image from the black-and-white image including features correlated with corresponding colors of the color image.

Application Example 2

In the above-described image data creation apparatus, watermark information specifying a color corresponding to the feature is embedded in an area being included in the black-and-white image and indicating the feature. Further, the color determination section acquires the watermark information from the black-and-white image, and determines the corresponding color on the basis of the watermark information.

According to this configuration, it is possible to, on the basis of watermark information embedded in areas being included in the black-and-white image, and indicating respective features, obtain color image data in which colors corresponding to the respective features are restored further faithfully.

Application Example 3

In the above-described image data creation apparatus, the watermark information is correlated with a watermark-information location corresponding to one portion which is included in each of a first area indicating the feature itself and a second area being a background of the feature, and which has a density level different from density levels of the other portions in each of the first area and the second area.

According to this configuration, it is possible to obtain color image data in which colors corresponding to respective features are further faithfully restored on the basis of watermark information embedded in the black-and-white image as watermark-information locations.

Application Example 4

In the above-described image data creation apparatus, the color image creation section creates the color image data corresponding to the color image in which, in the area indicating the feature, the feature is deleted.

According to this configuration, it is possible to obtain color image data corresponding to a color image in which the features included in the black-and-white image are deleted.

Application Example 5

In the above-described image data creation apparatus, the watermark information is embedded in the black-and-white image as the feature.

According to this configuration, it is possible to obtain color image data in which colors corresponding to respective features are further faithfully restored on the basis of watermark information embedded in the black-and-white image as watermark-information locations.

Application Example 6

In the above-described image data creation apparatus, the watermark information is embedded in the black-and-white image as a width of a line forming the feature.

According to this configuration, it is possible to obtain color image data in which colors corresponding to respective features are further faithfully restored on the basis of watermark information which is embedded in the black-and-white image as the width of a line forming each of the features.

Application Example 7

An image processing apparatus for converting color image data representing a color image, including: a pattern determination section configured to determine a single color pattern which allows a feature thereof corresponding to a color of the color image to be represented by a density level of one single color; a watermark information embedding processing section configured to embed watermark information specifying a color of the color image into the single color pattern; and an image data creation section configured to apply the single color pattern including the watermark information embedded therein to the color image, and thereby, create image data corresponding to a black-and-white image which corresponds to the color image, and which is represented by the single color pattern including the watermark information embedded therein.

According to this configuration, since the feature of a single color pattern reflects a corresponding color of a color image, it is possible to obtain image data which enables various users including, not only healthy persons, but also persons with disabilities in color perception, to distinguish the differences of colors in an original color image through recognition of the feature types. Moreover, since pieces of watermark information specifying colors corresponding to respective features are embedded in an obtained black-and-white image corresponding to acquired black-and-white image data, it is possible to faithfully restore original colors by using the pieces of watermark information.

Application Example 8

An image processing system including: an image processing apparatus configured to convert first color image data representing a color image; and an image data creation apparatus configured to create second color image data, wherein the image processing apparatus includes a pattern determination section configured to determine a single color pattern which allows a feature thereof corresponding to a color of the color image to be represented by a density level of one single color, a watermark information embedding processing section configured to embed watermark information specifying a color of the color image into the single color pattern, and an image data creation section configured to apply the single color pattern including the watermark information embedded therein to the color image, and thereby, create image data corresponding to a black-and-white image which corresponds to the color image, and which is represented by the single color pattern including the watermark information embedded therein, and wherein the image data creation apparatus includes an image data acquisition section configured to acquire image data corresponding to a black-and-white image which allows a feature thereof correlated with a color to be represented by a density level of one single color, a color determination section configured to determine a corresponding color which corresponds to the feature included in the black-and-white image, and a color image data creation section configured to create the color image data corresponding to a color image which allows an image area thereof indicating the feature to be represented in the corresponding color.

According to this image processing system, it is possible to obtain black-and-white image data which enables various users including, not only healthy persons, but also persons with disabilities in color perception, to distinguish the differences of colors in an original color image through recognition of the feature types. Further, according to this image data creation apparatus it is possible to restore color image data from the black-and-white image data.

Application Example 9

An image data creation method for creating color image data, including: acquiring image data corresponding to a black-and-white image which allows a feature thereof correlated with a color to be represented by a density level of one single color; determining a corresponding color which corresponds to the feature included in the black-and-white image; and creating the color image data corresponding to a color image which allows an image area thereof indicating the feature to be represented in the corresponding color.

In this way, it is possible to restore a color image from the black-and-white image including features correlated with respective colors included in the color image.

Application Example 10

An image processing method for converting color image data representing a color image, including: determining a single color pattern which allows a feature thereof corresponding to a color of the color image to be represented by a density level of one single color; embedding watermark information specifying a color of the color image into the single color pattern; and applying the single color pattern including the watermark information embedded therein to the color image, and thereby, creating image data corresponding to a black-and-white image which corresponds to the color image, and which is represented by the single color pattern including the watermark information embedded therein.

In this way, it is possible to obtain image data which enables various users including, not only healthy persons, but also persons with disabilities in color perception, to distinguish the differences of colors in an original color image through recognition of the feature types.

Application Example 11

An image data creation program for creating color image data, which causes a computer to function as the sections including: an image data acquisition section configured to acquire image data corresponding to a black-and-white image which allows a feature thereof correlated with a color to be represented by a density level of one single color; a color determination section configured to determine a corresponding color which corresponds to the feature included in the black-and-white image; and a color image data creation section configured to create the color image data corresponding to a color image which allows an image area thereof indicating the feature to be represented in the corresponding color.

According to this image data creation program, it is possible to restore a color image from a black-and-white image including features correlated with respective colors.

Application Example 12

An image processing program for converting color image data representing a color image, which causes a computer to function as the sections including: a pattern determination section configured to determine a single color pattern which allows a feature thereof corresponding to a color of the color image to be represented by a density level of one single color; a watermark information embedding processing section configured to embed watermark information specifying a color of the color image into the single color pattern; and an image data creation section configured to apply the single color pattern including the watermark information embedded therein to the color image, and thereby, create image data corresponding to a black-and-white image which corresponds to the color image, and which is represented by the single color pattern including the watermark information embedded therein.

According to this image processing program, it is possible to obtain image data which enables various users including, not only healthy persons, but also persons with disabilities in color perception, to distinguish the differences of colors in an original color image through recognition of the feature types.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereinafter, an embodiment according to the invention will be described with reference to the drawings. In addition, in this embodiment, a system including a host computer as an example of an image processing apparatus will be described.

Figure 1:
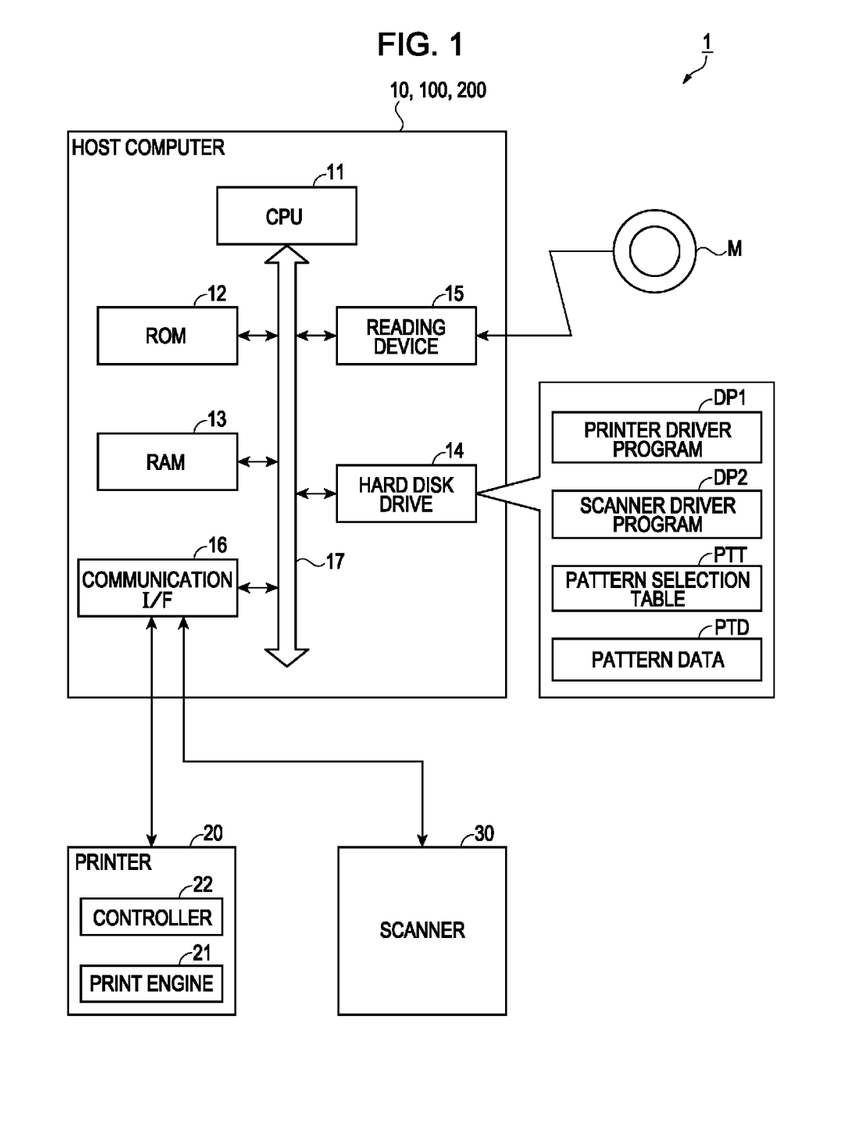
FIG. 1 is a diagram illustrating an outline of a configuration of an image processing system according to an embodiment of the invention.

Referring to FIG. 1 which is a diagram illustrating an outline of a configuration of an image processing system, an image processing system 1 includes a host computer 10, a printer 20 and a scanner 30. Further, the printer 20 and the scanner 30 are each connected to the host computer 10 so as to be data communicable with the host computer 10 via communication cables or wireless communication.

The printer 20 is provided with a print engine 21 for performing printing onto a medium such as print paper, and a controller 22 for controlling operations of the print engine 21, and the like. The printer 20 performs, under the control of the controller 22, processing for receiving print jobs from the host computer 10, processing for causing the print engine 21 to carry out print processes in accordance with the received print jobs, and the like.

The scanner 30 is a reading apparatus for reading the contents of documents. Further, in this embodiment, the scanner 30 is used for reading the result of printing having been performed by the printer 20.

The host computer 10 is, for example, a general-purpose personal computer including a printer driver and a scanner driver installed therein, and is a host computer for the printer 20 and the scanner 30. This host computer 10 is provided with a CPU 11, a ROM 12, a RAM 13, a hard disk drive 14, a reading device 15 and a communication I/F 16. These components of the host computer 10 are connected to a bus 17, and are configured so as to be data communicable with one another via the bus 17.

The CPU 11 is a control device for controlling individual components of the host computer 10. The ROM 12 is a non-volatile memory in which predetermined programs for controlling the host computer 10 are recorded, and the RAM 13 is a general-purpose memory used as a working memory and the like.

In the hard disk drive 14, a printer driver program (an image processing program) DP1, a scanner driver program (an image data creation program) DP2, as well as a pattern selection table PTT and pattern data PTD, which will be described below, are stored in advance. In addition, the driver programs DP1 and DP2 are supplied to the host computer 10 via a recording medium M including the driver program DP1 and the driver program DP2 recorded therein. Further, the driver programs DP1 and DP2, which have been read out from the recording medium M by the reading device 15, are stored in the hard disk drive 14. Known examples of the type of the recording medium M include an optical disk such as a CD-ROM or a DVD-ROM, and besides, a portable recording medium such as a magneto-optical disk, a USB memory or a memory card. Moreover, in the recording medium M, the pattern selection table PTT and the pattern data PTD are recorded, and the pattern selection table PTT and the pattern data PTD are stored into the hard disk drive 14 together with the driver programs DP1 and DP2. Nevertheless, the driver programs DP1 and DP2, the pattern table PTT and the pattern data PTD are not necessarily supplied to the host computer 10 in such a way as described above, but may be supplied thereto from a certain server via an electric communication link or an optical communication link.

The communication I/F 16 is an interface portion which is connected to the printer 20 and the scanner 30 via a cable or a wireless communication link. The communication between the host computer 10 and each of the printer 20 and the scanner 30 is performed via this communication I/F 16.

Further, when the CPU 11 of the host computer 10 has completed installing a printer driver by executing the printer driver program DP1 stored in the hard disk drive 14, the host computer 10 is activated as an image processing apparatus 100. Moreover, when the CPU 11 has completed installing a scanner driver by executing the scanner driver program DP2, the host computer 10 is also activated as an image data creation apparatus 200.

Figure 2:
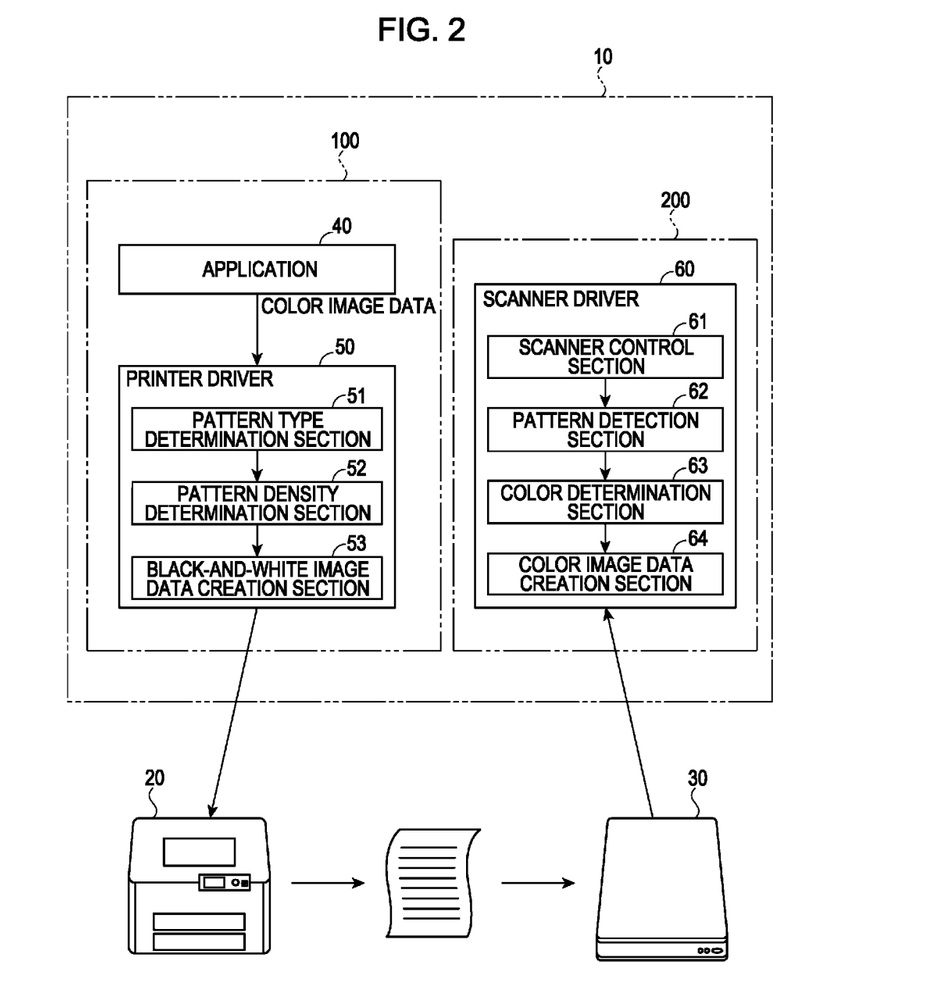
FIG. 2 is a diagram illustrating software configurations of an image processing apparatus and an image data creation apparatus, according to an embodiment of the invention.

Next, the image processing apparatus 100 and the image data creation apparatus 200 will be described below. FIG. 2 is a diagram illustrating a software configuration of each of the image processing apparatus 100 and the image data creation apparatus 200. As shown in FIG. 2, the image processing apparatus 100 includes an application 40 and a printer driver 50. The image data creation apparatus 200 includes a scanner driver 60.

The application 40 is software, such as document creation software or a web browser, which becomes a source of a printing request to the printer 20. The application 40 creates a printing request and color image data targeted for printing, and sends them to the printer driver 50.

The printer driver 50, which is software for controlling printing operations performed by the printer 20, creates print data, which is processable by the printer 20, from the printing request and the color image data having been received from the application 40, and sends the created print data to the printer 20 via the communication I/F 16. In this way, the printer driver 50 causes the printer 20 to carry out printing.

The scanner driver 60 is software for controlling document reading operations performed by the scanner 30, and performs processing for issuing an instruction for causing the scanner 30 to carry out the document reading operations, and processing for acquiring scan data corresponding to document images from the scanner 30 via the communication I/F 16, and the like.

Further, the printer driver 50 according to this embodiment has the function of converting color image data into black-and-white image data with hutching features, and thereby causing the printer 20 to perform printing of a black-and-white image with hutching features which enable distinction of the differences of colors in an original color image. In order to realize the function of printing the black-and-white image with hutching features, the printer driver 50 includes a pattern type determination section (a pattern determination section) 51, a pattern density determination section (a watermark information embedding processing section) 52 and a black-and-white image data creation section 53. In addition, these components of the printer driver 50 are activated by causing the CPU 11 to carry out the printer driver program DP1.

The pattern type determination section 51 performs processing for determining a hatching pattern (a single color pattern) which is applied to a color image area of color image data, in accordance with a color, particularly a hue level, of the color image area of the color image data. In addition, in this embodiment, a plurality types of hatching patterns, which allow hatching features, such as a vertical-line feature, a horizontal-line feature, a grid-line feature, an oblique-line feature and an oblique-grid-line feature, to be represented by different density levels of one single black color, are employed.

Figure 3:
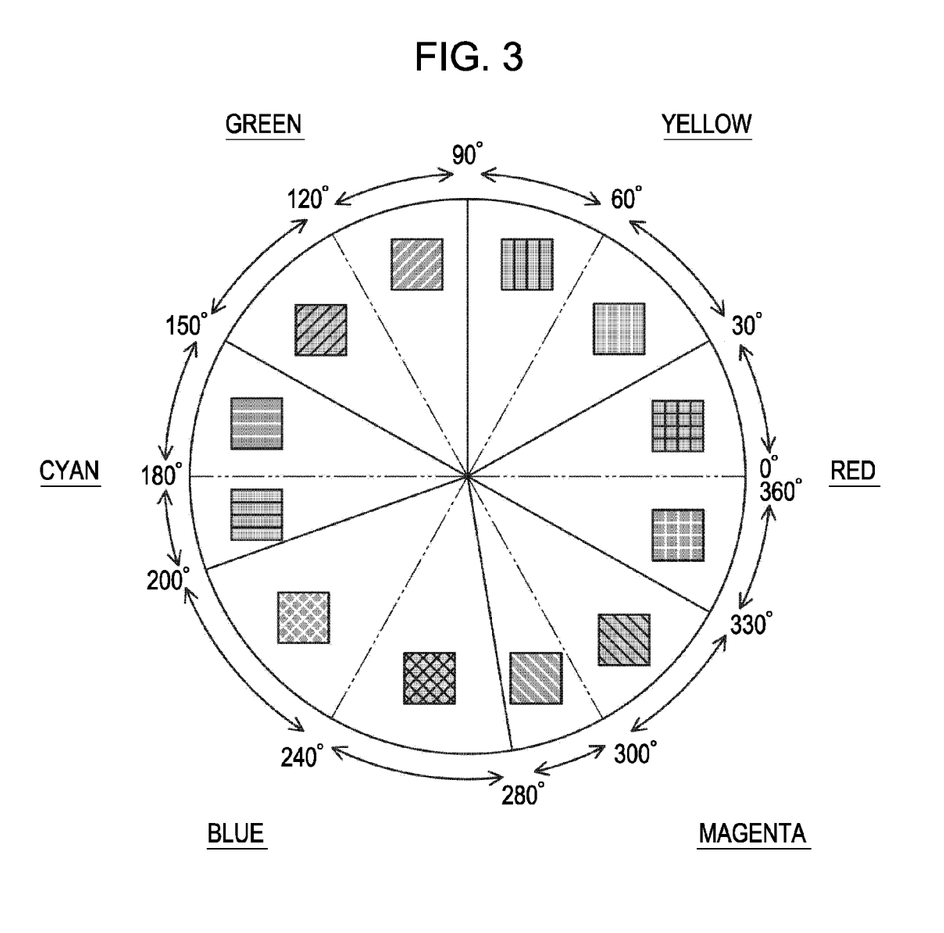
FIG. 3 is a diagram illustrating an example of correspondences between hue levels and hatching patterns on a hue circle, according to an embodiment of the invention.

FIG. 3 is a diagram illustrating an example of correspondences between hue levels and hatching patterns. As shown in FIG. 3, a hatching pattern corresponding to a predetermined hatching feature is allocated to each of color areas resulting from sectioning the hue angle of a color circle. In the example shown in FIG. 3, the hue angle of the hue circle is sectioned into twelve color areas, and a hatching pattern, such as a vertical-line pattern, a horizontal-line pattern, an oblique-line pattern, a grid-line pattern or an oblique-grid-line pattern, is allocated to each of the color areas in advance. The pattern type determination section 51 selects a hatching pattern corresponding to a hatching feature which is applied to a color image area from among the plurality of hatching patterns, in accordance with a hue angle of the color image area. In addition, in this embodiment, processing is performed such that, in accordance with hue angles, hatching patterns having different features are selected from among a plurality of hatching patterns, but, processing may be performed such that, in accordance with brightness levels or chromaticness levels, hatching patterns having different features are selected from among a plurality of hatching patterns.

The pattern density determination section 52 performs processing for determining the density of a hatching pattern in accordance with a color, particularly a brightness level, of a color image area of color image data. In addition, in this embodiment, a hatching pattern according to this embodiment includes a foreground area, which is a hatching feature itself, and a background area, which is a background of the foreground area. The pattern density determination section 52 determines a density level of a single color in a foreground area (hereinafter, referred to as a "foreground density") as well as the density level of a single color in a background area (hereinafter, referred to as a "background density").

Further, the pattern density determination section 52 performs, for each hatching pattern, processing for embedding watermark information specifying a color corresponding to a hatching feature, that is, an original color of a color image area. This processing for embedding watermark information will be described below.

The black-and-white image data creation section 53 performs processing for applying a hatching pattern to each image area of a color image, the hatching pattern having a hatching feature having been determined by the pattern type determination section 51, a foreground density and a background density having been determined by the pattern density determination section 52, and watermark information embedded therein. In this way, the black-and-white image data creation section 53 creates black-and white image data with hatching features having watermark information embedded therein.

Next, a method for converting color image data into black-and-white image data with hatching features will be described. First, the pattern selection table PTT and the pattern data PTD, which are used in the above-described processes performed by the patter type determination section 51 and the pattern density determination section 52, will be described. In addition, in the following description, it is assumed that color image data has RGB values for respective pixels included in a color image, the RGB value being a value resulting from representing each of red (R), green (G) and blue (B) colors by a gray-scale value "0 to 255" of 8 bits. It is assumed that black-and-white image data has K values for respective pixels included in a black-and-white image, the K value being a value resulting from representing a K (black) color by a gray-scale value "0 to 255" of 8 bits, that is, a density level of a single K color. Further, it is assumed that, for RGB values of color image data, (R, G, B)=(255, 255, 255) and (R, G, B)=(0, 0, 0) correspond to white color and black color, respectively, and for K values, K=0 and K=255 correspond to black color and white color, respectively. Nevertheless, in this embodiment, description will be made by taking, as an example, the above-described data formats of color image data and black-and-white image data, but, the data formats of color image data and black-and-white image data are not limited to those.

Figure 4:
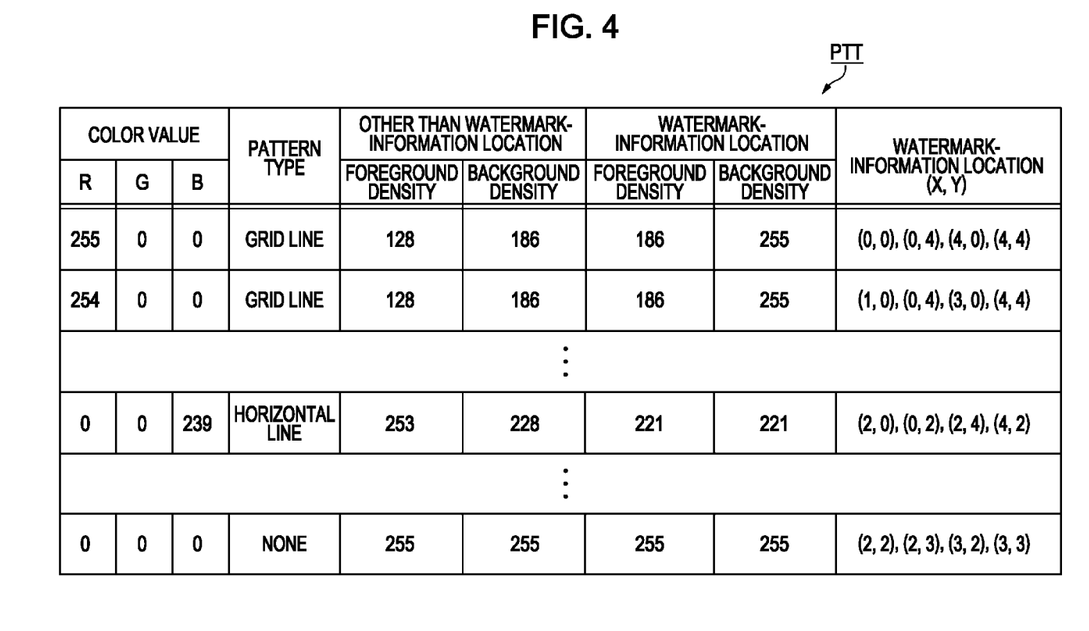
FIG. 4 is a diagram illustrating an example of a pattern selection table according to an embodiment of the invention.

FIG. 4 is an example of the pattern selection table PTT. As shown in FIG. 4, a pattern type, a foreground density and a background density are correlated with each RGB value, i.e., "Color Value", in the pattern selection table PTT.

In the pattern selection table PTT, in a column "Pattern Type", there are specified hatching-pattern types each being correlated with a color value, and being selected from among the plurality types of hatching patterns shown in FIG. 3, such as a vertical-line pattern, a horizontal-line pattern, a grid-line pattern, an oblique-line pattern and an oblique-grid-line pattern. In a column "Foreground Density", there are specified foreground density values each being correlated with a color value. In a column "Background Density", there are specified background density values each being correlated with a color value. In addition, the foreground density value and the background density value are each determined such that, for an area to which a hatching pattern P is applied, an average brightness value of the area before the hatching pattern P is applied is equal to an average brightness value of the area after the hatching pattern P has been applied.

According to this pattern selection table PTT, a hatching feature type, a foreground density value and a background density value corresponding to an RGB value of a color image are determined. That is, when converting color image data to black-and-white image data, the pattern type determination section 51 refers to the pattern type selection table PTT, and thereby, for each image area of color image data, selects a hatching pattern having a hatching feature specified in the column "Pattern Type" of the pattern selection table PTT. The pattern density determination section 52 refers to the pattern type selection table PTT, and thereby, determines a background density value specified in the column "Background Density" of the pattern selection table PTT as a background density value of the selected hatching pattern, and further, determines a foreground density value specified in column "Foreground Density" of the pattern selection table PTT as a foreground density value of the selected hatching pattern.

Moreover, in the pattern selection table PTT according to this embodiment, watermark-information locations, each indicating coordinates at which a piece of watermark information is embedded, are specified so as to correspond to each color value. Furthermore, the above-described foreground density value and background density value are separately specified for each of a group of pixels existing at locations other than the watermark-information locations and another group of pixels existing at the watermark-information locations.

Meanwhile, in the pattern data PTD, for each of the pattern types, such as a vertical-line pattern, a horizontal-line pattern, a grid-line pattern, an oblique-line pattern and an oblique-grid-line pattern, image data corresponding to the pattern type is determined in advance. The hatching pattern is an image having a predetermined size of, for example, an 8×8 pixel square, and includes at least information specifying an area included in a background an area included in a foreground in an image area thereof. Accordingly, as described below, when applying a hatching pattern to an image area, the pattern density determination section 52 can determine which area of a background area and a foreground area a target pixel in the image area corresponds to by referring to the pattern data PTD.

Next, an outline of processing for applying a hatching patter to a color image will be described. Here, description will be made by taking, as an example, a color image CP having a color value (R, G, B)=(255, 0, 0) throughout an area thereof, as shown in FIG. 5A.

Figure 5A:
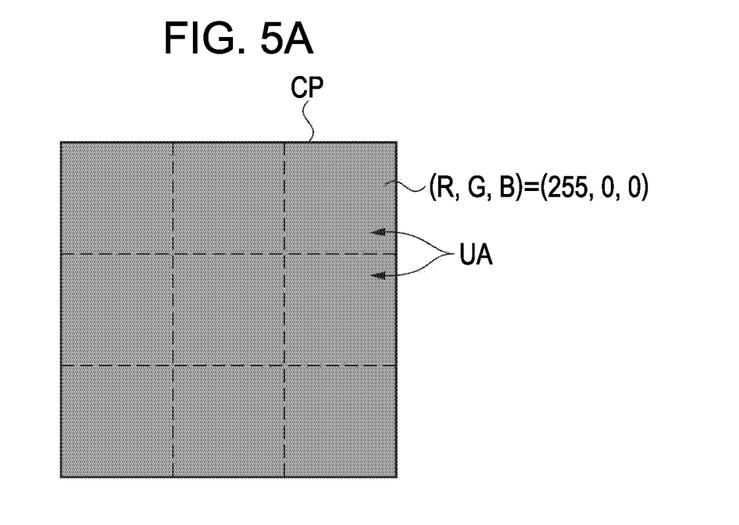
FIGS. 5A and 5B are diagrams each illustrating the allocation of hatching patterns, according to an embodiment of the invention.

In processing for applying a hatching pattern P to the color image CP, first, as shown in FIG. 5A, the hatching pattern P is allocated for each unit area UA, which is obtained by sectioning the entire image area of the color image CP by the same size as that of the hatching pattern P. Further, the type of the hatching pattern P to be allocated to the unit area UA is determined in accordance with the pattern selection table PTT. According to the pattern selection table PTT, a pattern type corresponding to an RGB value of the color image, i.e., a color value (R, G, B)=(255, 0, 0), is "grid line", and thus, the hatching pattern corresponding to the "grid line" is applied to the color image CP shown in FIG. 5A. Accordingly, as shown in FIG. 5B, for each unit area UA, the hatching pattern having grid lines is applied to a black-and-white image MP resulting from converting the color image CP.

Figure 5B:
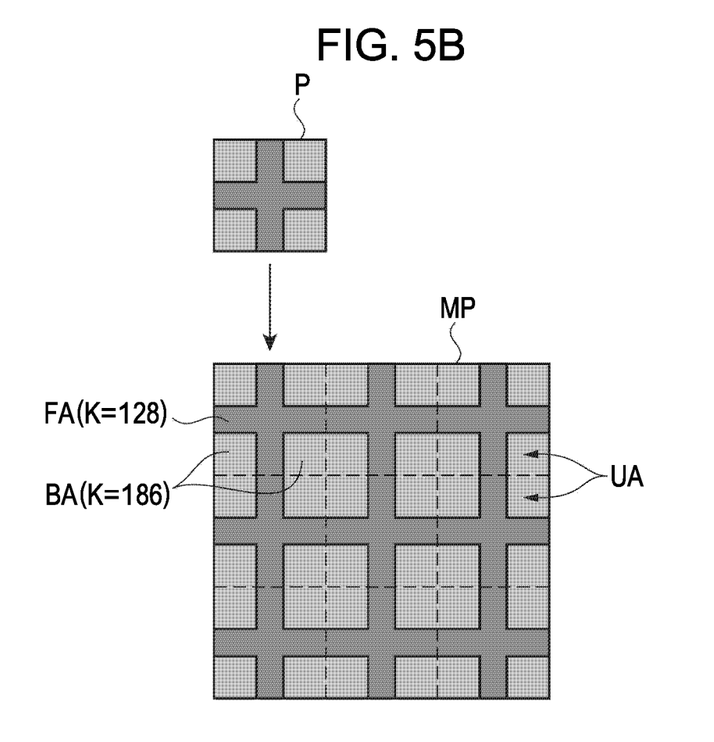

Further, according to the pattern selection table PTT shown in FIG. 4, a foreground density value K and a background density value K corresponding to an RGB value (R, G, B)=(255, 0, 0) are 128 and 186, respectively, and thus, as shown in FIG. 5B, a density value of a foreground FA and a density value of a background BA of the black-and-white image MP are 128 and 186, respectively. In such a way as described above, a hatching feature of the hatching pattern P determined in accordance with the pattern selection table PTT and the pattern data PTD is applied to the unit area UA.

Next, a method for embedding watermark information will be described. As shown in FIG. 4, in the pattern selection table PTT, a plurality groups of watermark-information locations each specifying coordinates in the relevant hatching pattern P, at which a piece of watermark information is embedded, are defined. These groups of watermark-information locations are determined in advance such that, between any two different RGB values, the contents of corresponding groups of watermark-information locations are not duplicated, and thus, an RGB value can be uniquely specified from among the plurality groups of watermark-information locations. Further, in the pattern selection table PTT, foreground and background density values at locations other than watermark-information locations, and foreground and background density values at watermark-information locations are separately defined.

Figure 6:
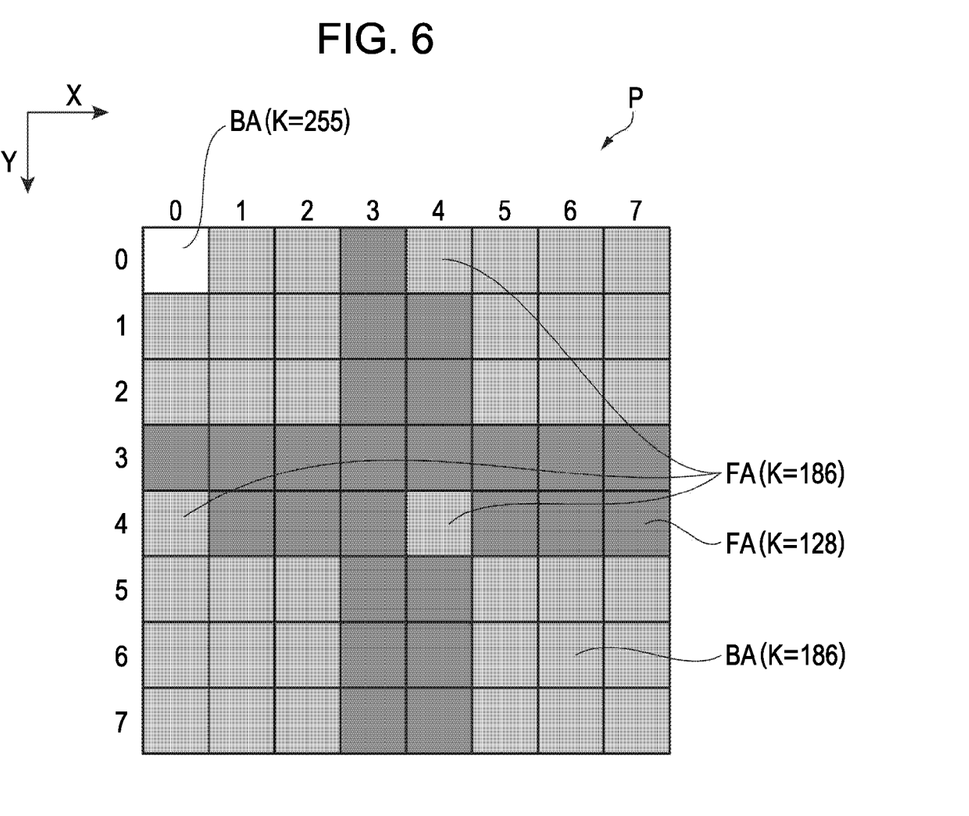
FIG. 6 is a diagram illustrating an example of a hatching pattern having watermark information embedded therein, according to an embodiment of the invention.

FIG. 6 is a diagram illustrating an example of a hatching pattern having watermark information embedded therein. In FIG. 6, just like in FIGS. 5A and 5B, the hatching pattern P, which corresponds to the color image CP having an RGB value (R, G, B)=(255, 0, 0) throughout an area thereof, is illustrated. According to the pattern selection table PTT shown in FIG. 4, a foreground density value and a background density value corresponding to the RGB value are "128" and "186", respectively, and thus, as shown in FIG. 6, density values of the foreground area FA and the background area BA existing at locations other than watermark-information locations are "128" and "186", respectively. Meanwhile, watermark-information locations corresponding to the RGB value (R, G, B)=(255, 0, 0) are (0, 0), (0, 4), (4, 0) and (4, 4), and thus, a foreground density value and a background density value at the watermark-information locations, that is, watermark density values, are applied to individual pixels located at relative coordinates (0, 0), (0, 4), (4, 0) and (4, 4) in the hatching pattern P. That is, the pixel located at (0, 0) is included in the background are BA, and thus, a background density value (K=255) is applied thereto. The respective pixels located at (0, 4), (4, 0) and (4, 4) are included in the foreground area FA, and thus, a foreground density (K=186) is applied thereto. In this way, in the hatching pattern P having watermark information embedded therein, the watermark information is embedded such that, in each area of the foreground area FA and the background are BA, the watermark-information locations can be specified from locations of pixels whose density values are different from those of the other pixels of the each area thereof. Moreover, it is possible to, by referring to the pattern selection table PTT, specify an original RGB value from four watermark-information locations.

As described above, the pattern density determination section 52 determines the density values of the hatching pattern P having watermark information embedded therein in accordance with the pattern selection table PTT, and subsequently, on the basis of the determined density values, the black-and-white image data creation section 53 creates black-and-white image data including watermark information embedded therein. The black-and-white image data with hatching features having watermark information embedded therein is outputted to the printer 20, and there, is printed as a black-and-white image having watermark information embedded therein.

Here, in the image processing system 1 according to this embodiment, the result of printing performed by the printer 20 is read in by the scanner 30. The scanner driver 60 has the function of, when the printing result of the black-and-white image data with hatching features has been read in by the scanner 30, restoring an original color image before adding hatching features thereto by discriminating the types of the hatching features from the scan data. In order to achieve this color restoration function, the scanner driver 60 of the image data creation apparatus 200 includes a scanner control section (an image data acquisition section) 61, a pattern detection section 62, a color determination section 63 and a color image data creation section 64. In addition, these components of the scanner driver 60 are activated by causing the CPU 11 to carry out the scanner driver program DP2. Hereinafter, the color restoration function performed by the scanner driver 60 will be described.

The scanner control section 61, which is a body portion of a driver for controlling the scanner 30, causes the scanner 30 to read a document, and acquires scan data as, for example, color image data in the RGB format or the like. In addition, as described above, since the image processing apparatus 100 is an apparatus for printing black-and-white images, scan data resulting from reading the result of printing performed by the image processing apparatus 100 is image data representing a black-and-white image in a color-image data format.

The pattern detection section 62 performs processing for detecting pattern areas corresponding to respective ones of the hatching patterns P described above from the scan data. In addition, as a method for detecting the pattern areas, a known image processing technique, such as a template matching technique using hatching patterns, is employed. For example, the pattern areas can be detected from an image of scan data by extracting particular areas from among image areas of scan data, each of the particular areas being an area for which a degree of similarity with a certain one of the hatching patterns P corresponding to respective hatching features of the pattern data PTD is larger than a predetermined value.

The color determination section 63 performs processing for determining corresponding colors which correspond to respective hatching features from the detected pattern areas in accordance with the pattern selection table PTT. In addition, as described above, the hatching pattern P having watermark information embedded therein is configured such that watermark-information locations can be specified by detecting the differences of density values in the foreground area FA and the differences of density values in the background area BA. The color detection section 63 extracts watermark-information locations of the detected hatching pattern P as watermark information, and determines a color corresponding to the watermark-information locations, that is, a color of an original color image, by referring to the pattern selection table PTT.

The color image data creation section 64 performs processing for creating color image data represented in colors having been determined by the color determination section 63. In this way, color image data resulting from restoring colors of color image data having been used by the image processing apparatus 100 when creating black-and-white image data can be obtained.

As described above, in the image processing system 1 according to this embodiment, the host computer 10 allows processing as the image processing apparatus 100 to cause printing of a color image corresponding to color image data to be performed as printing of a black-and-white image having watermark information embedded therein. Moreover, the host computer 10 allows processing as the image data creation apparatus 200 to make it possible to obtain color image data resulting from restoration of original colors from the printing result of the black-and-white image.

Figure 7:
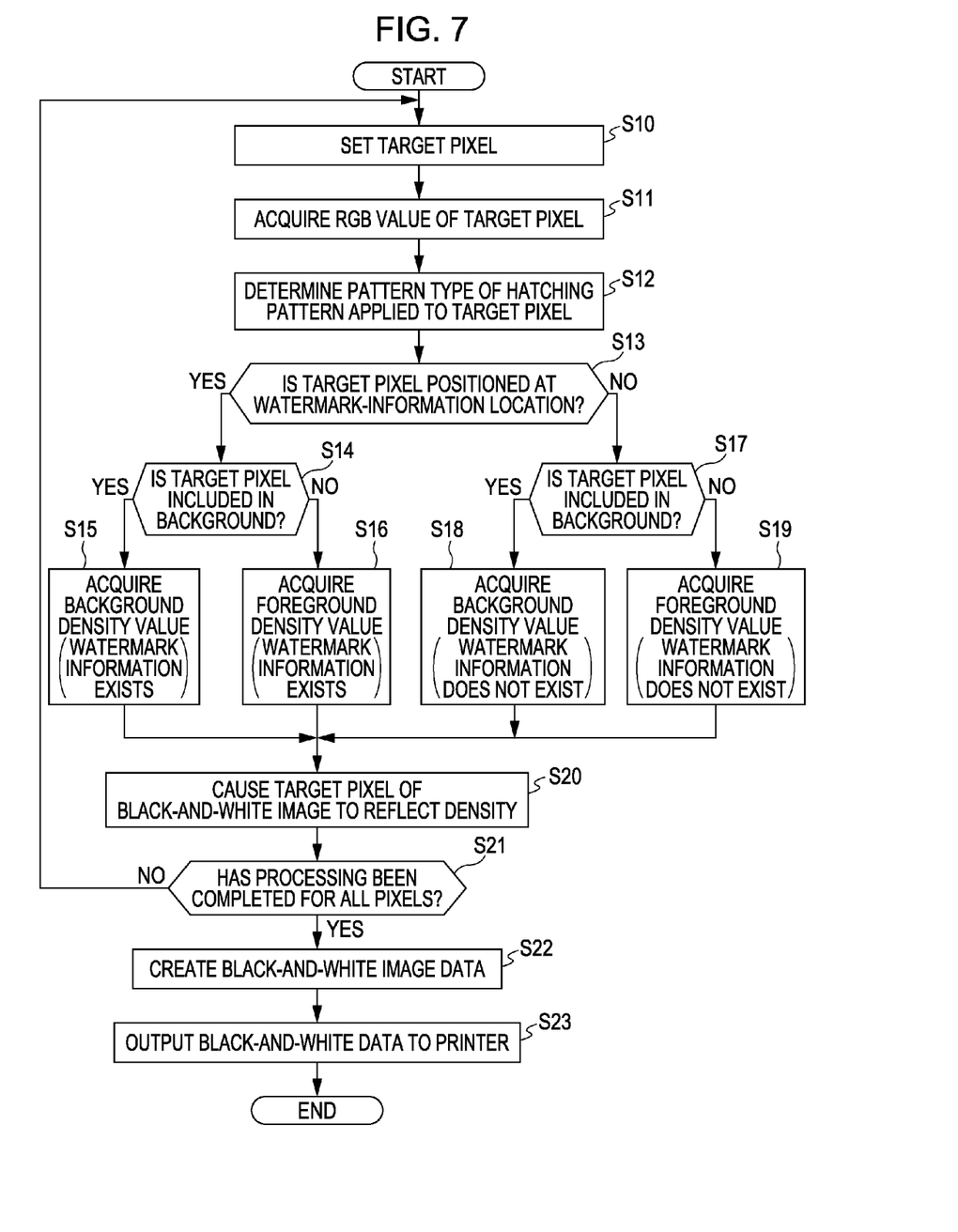
FIG. 7 is a flowchart illustrating a flow of processing performed by an image processing apparatus according to an embodiment of the invention.

Next, processing as the image processing apparatus 100 performed by the host computer 10 will be described in detail in accordance with a flowchart shown in FIG. 7. For example, when the printer driver 50 has received a print instruction from the application 40 for instructing black-and-white printing of color image data, processing shown in FIG. 7 is started. When the processing has been started, the pattern type determination section 51 sets a target pixel for an image area of color image data (step S10), and acquires an RGB value of the target pixel from the color image data (step S11).

Next, the pattern type determination section 51 refers to the pattern selection table PTT, and determines a pattern type corresponding to the acquired RGB value (step S12).

Figure 8:
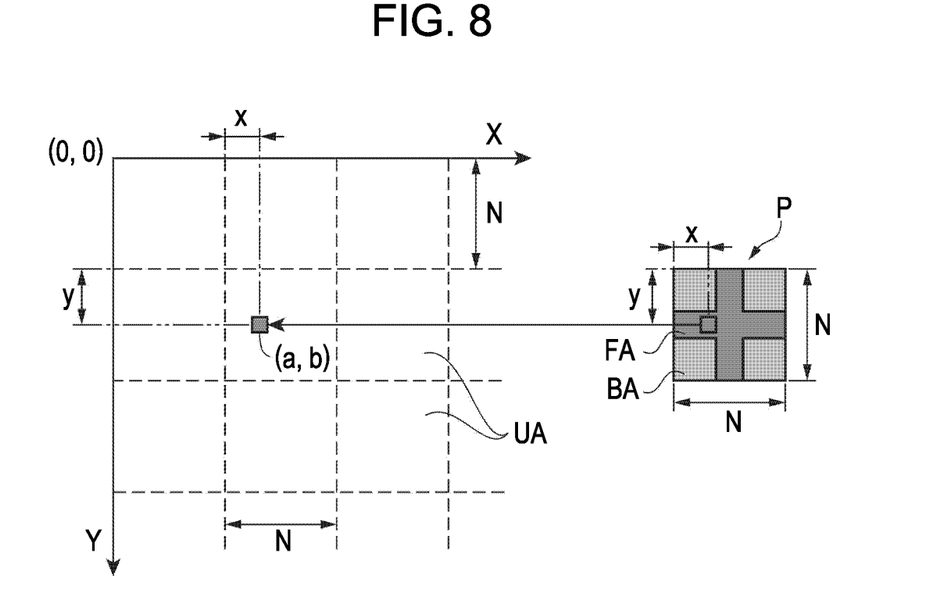
FIG. 8 is a diagram illustrating the allocation of a hatching pattern to a target pixel, according to an embodiment of the invention.

Next, the pattern density determination section 52 refers to the pattern selection table PTT, and determines whether the location of the target pixel corresponds to any one of watermark-information locations, or not (step S13). In addition, as described in FIGS. 5A and 5B, the hatching pattern P is allocated to the unit area UA having a predetermined size in an image area of a color image, and thus, here, the pattern density determination section 52 calculates relative coordinates of the target pixel in the hatching pattern P which is allocated for each unit area UA. Further, the pattern density determination section 52 refers to the pattern selection table PTT, and determines whether the relative coordinates of the target pixel correspond to any one of the watermark-information locations, or not. Specifically, as shown in FIG. 8, supposing that the coordinates of a target pixel are (a, b), and the size of the hatching pattern P is N×N pixel square, the relative coordinates (x, y) of the target pixel in the hatching pattern P can be calculated by using formulas (2) and (3) described below. In addition, in the formulas described below, "mod" is an operator for returning the remainder of a division. The pattern density determination section 52 refers to the watermark-information locations in the pattern selection table PTT, and thereby, determines whether the relative coordinates (x, y) of the target pixel correspond to any one of the watermark-information locations, or not.

$$x = a \bmod N \quad (2)$$

$$y = b \bmod N \quad (3)$$

If the relative coordinates of the target pixel correspond to any one of the watermark-information locations (step S13: Yes), the pattern density determination section 52 refers to image data of the hatching pattern P included in the pattern data PTD, and determines which area of a foreground and a background of the hatching pattern P the relative coordinates (x, y) correspond to (step S14).

If the relative coordinates of the target pixel correspond to the background area of the hatching pattern P (step S14: Yes), the pattern density determination section 52 refers to the pattern selection table PTT, and acquires a background density value corresponding to a background having watermark information therein, and corresponding to an RGB value of the target pixel (step S15). If the relative coordinates of the target pixel correspond to the foreground of the hatching pattern P (step S14: No), the pattern density determination section 52 refers to the pattern selection table PTT, and acquires a foreground density value corresponding to a foreground having watermark information therein, and corresponding to the RGB value of the target pixel (step S16).

Meanwhile, if the relative coordinates of the target pixel does not correspond to any one of the watermark-information locations (step S13: No), the pattern density determination section 52 refers to image data of the hatching pattern P included in the pattern data PTD, and determines which area of a foreground area and a background area of the hatching pattern P the relative coordinates (x, y) correspond to (step S17). If the relative coordinates of the target pixel correspond to the background area of the hatching pattern P (step S17: Yes), the pattern density determination section 52 refers to the pattern selection table PTT, and acquires a background density value corresponding to a background having no watermark information therein, and corresponding to the RGB value of the target pixel (step S18). If the relative coordinates of the target pixel correspond to the foreground area of the hatching pattern P (step S17: No), the pattern density determination section 52 refers to the pattern selection table PTT, and acquires a foreground density value corresponding to a foreground having no watermark information therein, and corresponding to the RGB value of the target pixel (step S19).

When the pattern density determination section 52 has acquired a K value corresponding to a foreground density value or a background density value in any one of steps S15 to S19, next, the black-and-white image data creation section 53 causes a pixel corresponding to the target pixel included in an image area of a black-and-white image to reflect the acquired K value indicating a foreground density value or a background density value (step S20). In this way, as a result, a pixel of a black-and-white image, corresponding to the target pixel, has a K value indicating a density value corresponding to the hatching pattern P whose type has been determined in step S12.

When the target pixel has reflected a density value of a foreground or a background, the black-and-white image data creation section 53 determines whether, for all of pixels of the color image, processing in steps S10 to S20 has been performed, or not (step S21). If the processing has not yet been completed for all of pixels (step S21: No), the process flow returns to step S10, where the target pixel is scanned in a raster direction to set a new pixel, and the processing following step S11 is performed on the new target pixel. When the processing has been completed for all of pixels (step S21: Yes), each of all pixels of a black-and-white image results in a state where it has a K value indicating a density value corresponding to the hatching pattern P whose type has been determined in step S12, and the black-and-white image data creation section 53 creates black-and-white image data corresponding to this black-and-white image (step S22). The created black-and-white image data is outputted to the printer 20 by the printer driver 50 (step S23). In such a way as described above, a black-and-white image having hatching features is printed as black-and-white based printing of color image data having been received from the application 40.

Next, processing as the image data creation apparatus 200 performed by host computer 10 will be described in detail in accordance with a flowchart shown in FIG. 9.

Figure 9:
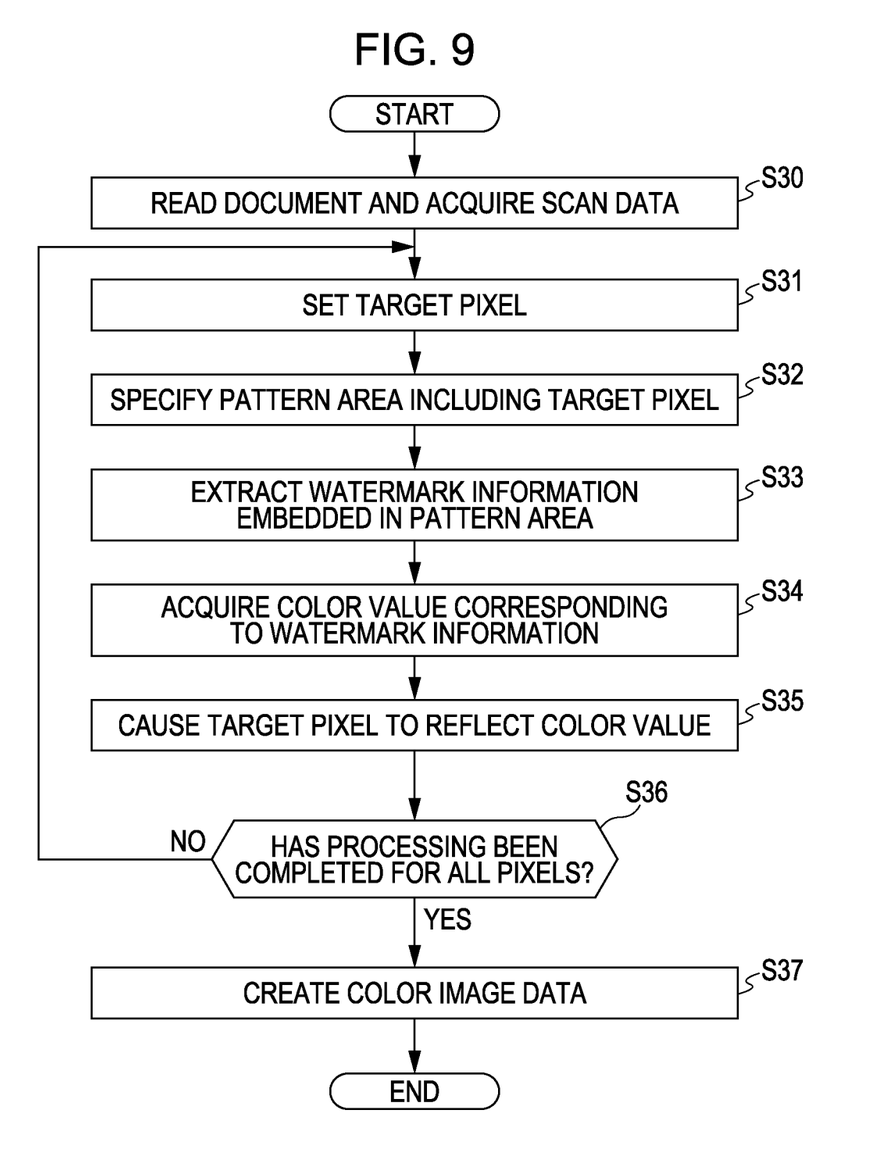
FIG. 9 is a flowchart illustrating a flow of processing performed by an image data creation apparatus according to an embodiment of the invention.

For example, when a user sets a printing result of a black-and-white image with hatching features on a document table of the scanner 30, and inputs an instruction for reading a document to the scanner driver 60, processing shown in FIG. 9 is started. When the processing has been stared, the scanner control section 61 causes the scanner 30 to read in the draft, receives read-in scan data related to the draft from the scanner 30, and thereby, acquires scan data (step S30). In addition, this scan data is data obtained by reading a printing result of a black-and-white image, thus, represents a black-and-white image although having a color-image data format, and corresponds to black-and-white data.

Next, the pattern type detection section 62 sets a target pixel relative to an image area of a black-and-white image included in the scan data (step S31), and specifies a pattern area including the target pixel (step S32). This pattern area is an area corresponding to the unit area A, which is a unit to which any one of the hatching patterns P is applied, and by performing image processing, such as template matching using each of the hatching patterns P, pattern areas corresponding to respective ones of the hatching patterns P are specified.

Next, the color determination section 63 detects watermark information from each of the pattern areas, corresponding to the hatching pattern P (step S33). Here, watermark-information locations, which are watermark information, are detected such that the foreground area FA and the background area BA in the specified pattern area are discriminated, and for each of the foreground area FA and the background area BA, the position of a pixel having a density value whose difference with the density value of each of surrounding pixels is larger than a predetermined value is specified.

Next, the color image data creation section 64 refers to the pattern selection table PTT, acquires a color value corresponding to the watermark-information locations (step S34), and causes the target pixel of the color image data to reflect the acquired color value (step S35).

When the target pixel has reflected the acquired color value, the color image data creation section 64 determines whether the processing in steps S31 to S35 has been performed for all pixels of the black-and-white image, or not (step S36). If the processing has not yet been completed for all the pixels (step S36: No), the process flow returns to step S31, where, for example, by scanning the target pixel in a raster direction, a new target pixel is set, and the processing following step S32 is performed on the new pixel. If the processing has been completed for all the pixels (step S36: Yes), each of all the pixels of the color image results in a state where it has a color value, and thus, the color image data creation section 64 creates color image data corresponding to this color image (step S37). The created color image data is stored in a predetermined storage area of the hard disk drive 14 or the like by the scanner driver 60. In such a way as described above, color image data, which represents an original color, that is, a color before the processing performed by the image processing apparatus 100, can be obtained from the printing result of a black-and-white image with hatching features.

According to the above-described image processing apparatus 100, from color image data, black-and-white image data resulting from performing hatching of a hatching feature corresponding to a color of a color image corresponding to the color image data is created. This enables various users including not only healthy persons but also persons with disabilities in color perception to recognize the types of hatching features, and easily distinguish the differences of colors in an original color image.

Further, according to the image data creation apparatus 200, it is possible to, from a black-and-white image corresponding to scan data having been read in by the scanner 30, restore color image data corresponding to a color image before a conversion of the color image to the black-and-white image performed by the image processing apparatus 100.

Accordingly, according to the image processing system 1 of this embodiment, it is possible to convert a color image to a black-and-white image with hatching features, and further, restore the color image from the black-and-white image with hatching features. For this reason, it is possible to provide a system which is excellent for users in convenience.

Further, a black-and-white image corresponding to black-and-white image data having been converted by the image processing apparatus 100 includes watermark information embedded therein, and thus, the image data creation apparatus 200 can restore color image data as the result of faithful reproduction of a color of an original color image.

Moreover, in a color image corresponding to color image data having been created by the image data creation apparatus 200, hatching features are deleted, and thus, it is possible to obtain color image data which is easily viewable for users, and which results from restoration of a color image as of before the application of hatching features.

Hereinbefore, an embodiment according to the invention has been described, but the invention is not limited to this embodiment, and can be changed or modified without departing from the gist of the invention and the scope of the claims of the invention. Moreover, naturally, the invention includes equivalents thereof. Hereinafter, modification examples will be described.

Modification Example 1

In this embodiment described above, the processing as the image processing apparatus 100 for converting color image data into black-and-white image data with hatching features is performed in the processing at the host computer 10 side, but may be performed as internal processing of the printer 20. Further, the processing as the image data creation apparatus 200 for converting black-and-white image data with hatching features into color image data may be performed as internal processing of the scanner 30. Moreover, a multifunction device having a printer function and a scanner function may be configured to perform processing as the image processing apparatus 100 and processing as the image data creation apparatus 200.

Modification Example 2

In the above-described embodiment, in the foreground area FA and the background area BA, watermark information is embedded in a black-and-white image by correlating the location of a pixel, which causes a difference of a density value with each of surrounding pixels, with watermark information, but the method of embedding the watermark information is not limited to this method. For example, the watermark information may be embedded by using the largeness of a difference between a density value of the foreground area FA and a density value of the background area BA, or the width of each of lines forming a hatching feature.

Figure 10A:
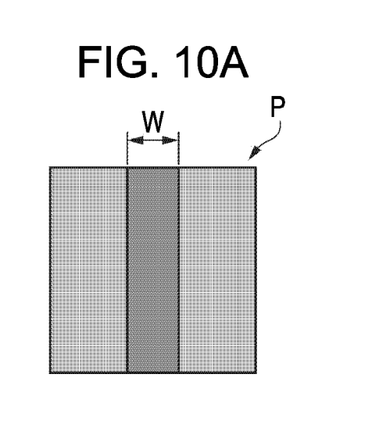
FIGS. 10A, 10B and 10C are diagrams each illustrating Modification Example 2.
Figure 10B:
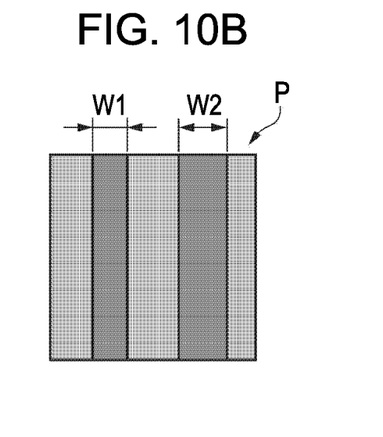
Figure 10C:
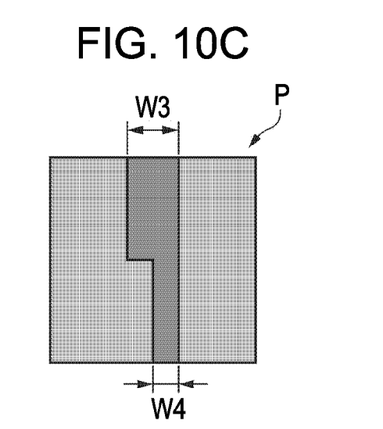

In the case where the width of each of lines forming a hatching feature is used, as shown in FIG. 10A, the watermark information may be embedded by creating a black-and-white to which the hatching pattern P having a line width W corresponding to a color of a relevant color image is applied. Further, as shown in FIG. 10B, the watermark information may be embedded by causing the hatching pattern P to have a plurality of lines, and correlating combinations of the widths W1 and W2 of the plurality of lines with the watermark information. Moreover, as shown in FIG. 10C, the watermark information may be embedded by causing a line to have a plurality of line widths W3 and W4, with which the watermark information is correlated.

Modification Example 3

The types of hatching features themselves corresponding to respective colors of a color image may be made watermark information. That is, color image data may be obtained by causing the image processing apparatus 100 to create black-and-white image data to which hatching features are applied, and causing the image data creation apparatus 200 to discriminate the types of the hatching features from the scanned black-and-white image, and determine colors corresponding to the respective types of the hatching features as corresponding colors Modification Example 4

In the above-described embodiment, as patterns of features applied to a color image, the hatching patterns P having corresponding hatching features are used, but different patterns which have corresponding features other than the hatching features, and which have features each having predetermined regularity may be used.

The entire disclosure of Japanese Patent Application No. 2012-004819, filed Jan. 13, 2012 is expressly incorporated by reference herein

What is claimed is:
1. An image data creation apparatus for creating color image data, comprising:
an image data acquisition section configured to acquire image data corresponding to a black-and-white image which correlates a black-and-white pattern with a cor- responding color, the black-and-white pattern including a feature thereof which may varied according to a density level of one single color;

a color determination section configured to determine the corresponding color which corresponds to the feature included in the black-and-white pattern; and a color image data creation section configured to create the color image data corresponding to a color image which allows an image area thereof indicating the feature to be represented in the corresponding color.

2. The image data creation apparatus according to claim 1, wherein watermark information specifying a color corresponding to the feature is embedded in an area being included in the black-and-white image and indicating the feature, and the color determination section acquires the watermark information from the black-and-white image, and determines the corresponding color on the basis of the watermark information.

3. The image data creation apparatus according to claim 2, wherein the watermark information is correlated with a watermark-information location corresponding to one portion which is included in each of a first area indicating the feature itself and a second area being a background of the feature, and which has a density level different from density levels of the other portions in each of the first area and the second area.

4. The image data creation apparatus according to claim 1, wherein the color image creation section creates the color image data corresponding to the color image in which, in the area indicating the feature, the feature is deleted.

5. The image data creation apparatus according to claim 2, wherein the watermark information is embedded in the black-and-white image as the feature.

6. The image data creation apparatus according to claim 2, wherein the watermark information is embedded in the black-and-white image as a width of a line forming the feature.

7. An image processing apparatus for converting color image data representing a color image, comprising:

a pattern determination section configured to determine a single color pattern which allows a feature thereof corresponding to a color of the color image to be represented by a density level of one single color, the single color pattern comprising a black-and-white pattern which is correlated with the single color of the color image, the black-and-white pattern including a feature thereof which may be varied according to the density of the single color;

a watermark information embedding processing section configured to embed watermark information specifying a color of the color image into the single color pattern; and an image data creation section configured to apply the single color pattern including the watermark information embedded therein to the color image, and thereby, create image data corresponding to a black-and-white image which corresponds to the color image, and which is represented by the single color pattern including the watermark information embedded therein.

8. An image processing system comprising:

an image processing apparatus configured to convert first color image data representing a color image; and an image data creation apparatus configured to create second color image data, wherein the image processing apparatus includes a pattern determination section configured to determine a single color pattern which allows a feature thereof corresponding to a color of the color image to be represented by a density level of one single color, the single color pattern comprising a black-and-white pattern which is correlated with a color of the color image, the black-and-white pattern including a feature thereof which may be varied according to the density of the color, a watermark information embedding processing section configured to embed watermark information specifying a color of the color image into the single color pattern, and an image data creation section configured to apply the single color pattern including the watermark information embedded therein to the color image, and thereby, create image data corresponding to a black-and-white image which corresponds to the color image, and which is represented by the single color pattern including the watermark information embedded therein, and wherein the image data creation apparatus includes an image data acquisition section configured to acquire image data corresponding to a black-and-white image which allows a feature thereof correlated with a color to be represented by a density level of one single color, a color determination section configured to determine a corresponding color which corresponds to the feature included in the black-and-white image, and a color image data creation section configured to create the color image data corresponding to a color image which allows an image area thereof indicating the feature to be represented in the corresponding color.

* * * * *